US010949668B2

(12) United States Patent
Ha et al.

(10) Patent No.: US 10,949,668 B2
(45) Date of Patent: Mar. 16, 2021

(54) ELECTRONIC APPARATUS AND METHOD FOR CONTROLLING THEREOF

(71) Applicant: Samsung Electronics Co., Ltd, Gyeonggi-do (KR)

(72) Inventors: Chang-ho Ha, Hwaseong-si (KR); Hyung-jong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 15/871,886

(22) Filed: Mar. 30, 2018

(65) Prior Publication Data

US 2018/0247124 A1 Aug. 30, 2018

(30) Foreign Application Priority Data

Feb. 24, 2017 (KR) .................. 10-2017-0024698

(51) Int. Cl.
| | | |
|---|---|---|
| *G06K 9/00* | (2006.01) | |
| *A47L 9/28* | (2006.01) | |
| *G06K 9/20* | (2006.01) | |
| *G06K 9/62* | (2006.01) | |
| *G01C 21/20* | (2006.01) | |
| *G06T 11/60* | (2006.01) | |

(52) U.S. Cl.
CPC .......... *G06K 9/00671* (2013.01); *A47L 9/28* (2013.01); *A47L 9/2805* (2013.01); *A47L 9/2857* (2013.01); *A47L 9/2894* (2013.01); *G06K 9/2081* (2013.01); *G06K 9/6202* (2013.01); *G01C 21/20* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2014/0303775 A1* | 10/2014 | Oh | ...................... | G05D 1/0033 700/253 |
| 2015/0032260 A1* | 1/2015 | Yoon | .................. | A47L 11/4011 700/257 |
| 2016/0174789 A1 | 6/2016 | Han et al. | | |

(Continued)

FOREIGN PATENT DOCUMENTS

| | | |
|---|---|---|
| DE | 102014217843 A1 | 3/2016 |
| JP | 2002354139 A | 12/2002 |

(Continued)

OTHER PUBLICATIONS

European Search Report dated Aug. 3, 2018 in connection with European Patent Application No. 18 15 3528.

*Primary Examiner* — Leon Viet Q Nguyen

(57) ABSTRACT

An electronic apparatus is provided. The electronic apparatus according to various embodiments includes a display, a camera configured to photograph a peripheral area of a cleaner, and a processor configured to control to display an image of the peripheral area of the cleaner photographed through the camera, determine an area which has the same pattern as a cleaning object of the cleaner selected by a user input in the peripheral area of the cleaner based on the photographed image, display a mark on an area which has the same pattern as the cleaning object in the photographed image, and display guide information for guiding a movement of the cleaner to the area in which the mark is displayed.

17 Claims, 17 Drawing Sheets

(56) References Cited

U.S. PATENT DOCUMENTS

2017/0164802 A1* 6/2017 Cudzilo .............. G05B 19/042
2018/0074508 A1* 3/2018 Kleiner ................ A47L 9/0488

FOREIGN PATENT DOCUMENTS

| KR | 20160024898 A | 3/2016 | | |
| KR | 20160074258 A | 6/2016 | | |
| WO | WO2015183005 A1 * | 12/2015 | .............. | H04B 1/40 |

* cited by examiner

200

600

ELECTRONIC APPARATUS AND METHOD FOR CONTROLLING THEREOF

CROSS-REFERENCE TO RELATED APPLICATIONS

This application is based on and claims priority from Korean Patent Application No. 10-2017-0024698, filed on Feb. 24, 2017 in the Korean Intellectual Property Office, the disclosure of which is incorporated herein by reference in its entirety.

TECHNICAL FIELD

Aspects of the embodiments relate to an electronic apparatus and a controlling method thereof, and more specifically, to an electronic apparatus which provides cleaning guide information and a controlling method thereof.

BACKGROUND

A cleaner is an apparatus for cleaning a floor of an interior and the like. Generally, a user confirms foreign materials such as dust while seeing a floor by oneself, and then moves the cleaner to where the foreign materials exist and performs a cleaning operation.

However, the cleaning operation may be boring according to this method, and especially, there may be a problem that the cleaning operation on an entire cleaning area is not performed completely because a user may not see and pass the area in which the foreign materials exists.

In addition, since it is difficult to divide accurately the area for which a cleaning operation is completed and the area for which the cleaning operation is not completed while performing the cleaning operation, the cleaned area may be cleaned again, and thus, there may be a problem that the unnecessary power consumption and time waste occur.

SUMMARY

Embodiments of the present disclosure has been made to solve the above problems, and in accordance with an aspect of the present disclosure, an electronic apparatus which can completely clean a cleaning object area as long as the cleaning is performed according to a cleaning guide displayed on a portable apparatus without identifying the foreign materials on a floor with the eyes of a user while performing the cleaning operation, and a controlling method thereof are provided.

According to an embodiment, there is provided an electronic apparatus including a display, a camera configured to photograph a peripheral area of a cleaner, and a processor configured to control to display an image of the peripheral area of the cleaner photographed through the camera, determine an area which has the same pattern as a cleaning object of the cleaner selected by a user input in the peripheral area of the cleaner based on the photographed image, display a mark on an area which has the same pattern as the cleaning object in the photographed image, and display guide information for guiding a movement of the cleaner to the area in which the mark is displayed.

The guide information may include information on a moving direction to move the cleaner to the area in which the mark is displayed.

The electronic apparatus further includes a communicator configured to perform communication with the cleaner, and the processor may receive location information of the cleaner from the cleaner through the communicator.

The processor may photograph a peripheral area of the cleaner which moves according to a movement of the cleaner, through the camera, determine an area which has the same pattern as the cleaning object in the peripheral area of the moving cleaner, and display the mark.

The processor, in response to determining that the cleaner passes the area in which a mark is displayed, in the photographed image, based on the location information of the cleaner received from the cleaner, may remove a mark displayed on an area where the cleaner passes or displays a mark different from the displayed mark.

The processor, in response to an area which has the same pattern as the cleaning object in the photographed image corresponding to an area where the cleaner has passed previously, may do not display the mark.

The processor may determine a moving route of the cleaner based on the location information of the cleaner, generate a cleaning map based on the determined moving route, and display guide information regarding a moving direction of the cleaner on the display based on the generated cleaning map.

The processor may display the mark and the guide information on the captured image through an augmented reality.

The processor, in response to a user input of selecting a specific area of the photographed image being received while an image photographed through the camera is displayed on the display, may select the selected area as the cleaning object.

According to an embodiment, there is provided a method for controlling an electronic apparatus including photographing a peripheral area of a cleaner through a camera and displaying the peripheral area of a cleaner, determining an area which has the same pattern as a cleaning object of the cleaner selected according to a user input in the peripheral area of the cleaner based on the photographed image, displaying a mark on the area which has the same pattern as the cleaning object in the photographed image, and displaying guide information to induce a movement of the cleaner to an area in which the mark is displayed.

The guide information may include information on a moving direction to move the cleaner to the area in which the mark is displayed.

The method further includes receiving location information of the cleaner from the cleaner.

The method further includes photographing a peripheral area of the cleaner which moves according to a movement of the cleaner, and determining an area which has the same pattern as the cleaning object in the peripheral area of the moving cleaner, and displaying the mark.

The method further includes, in response to determining that the cleaner passes the area in which a mark is displayed, in the photographed image, based on the location information of the cleaner received from the cleaner, removing a mark displayed on an area where the cleaner passes or displaying a mark different from the displayed mark.

The method further includes, not displaying the mark in response to an area which has the same pattern as the cleaning object in the photographed image corresponding to an area where the cleaner has passed previously.

The method further includes, determining a moving route of the cleaner based on the location information of the cleaner, and generating a cleaning map based on the determined moving route, and displaying guide information regarding a moving direction of the cleaner based on the generated cleaning map.

The displaying the mark and the guide information may include displaying on the captured image through an augmented reality.

The method further includes, receiving a user input of selecting a specific area of a photographed image while an image photographed through the camera is displayed on the display, and selecting the selected area as the cleaning object.

According to an embodiment of the present disclosure, the cleaning operation may be the operation which provides fun, not the boring operation, and the entire cleaning area may be cleaned perfectly as long as the cleaning operation is performed according to the displayed cleaning guide.

DETAILED DESCRIPTION

Figure 1:
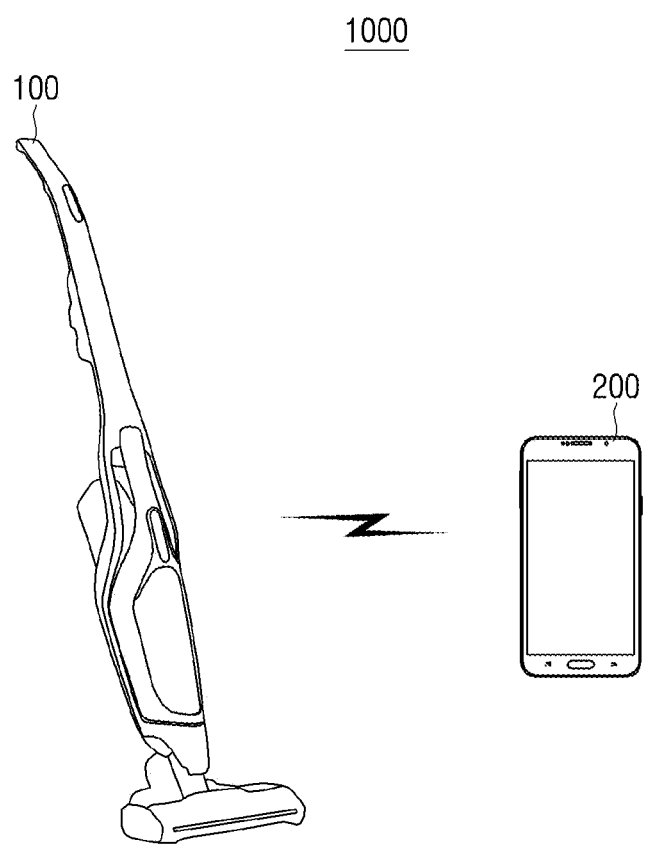
FIG. 1 is a view illustrating a cleaning system according to an embodiment.

The terms used in the present embodiment and the claims are general terms selected in consideration of the functions of the various example embodiments of the present embodiment. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Furthermore, specific embodiments will be illustrated in the drawings and described in detail in the detailed description part. However, this does not necessarily limit the scope of the embodiments to a specific embodiment form.

Hereinafter a display apparatus according to an embodiment will be described with reference to the drawings attached hereto.

FIG. 1 is a view illustrating a cleaning system according to an embodiment.

Referring to FIG. 1, a cleaning system 1000 according to an embodiment includes a cleaner 100 and an electronic apparatus 200.

The cleaner 100 may perform a cleaning operation. Specifically, the cleaner 100 may drive an air suction apparatus consisting of a motor, a fan and the like included in an interior of a main body of the cleaner, and accordingly, the cleaner 100 may perform a cleaning operation by sucking the air including foreign materials from an outside.

Meanwhile, it has been described that the cleaner 100 is a wireless vacuum cleaner, but it is not limited thereto, and the cleaner 100 may be various types of cleaners such as a wired vacuum cleaner or a wired/wireless steam cleaner, which may perform a cleaning operation.

The electronic apparatus 200 may display guide information for guiding the movement of the cleaner 100.

Specifically, the electronic apparatus 200 may determine the area to be cleaned by the cleaner 100 in the image photographed through a camera, and display the guide information for guiding the cleaner 100 to move to the area to be cleaned.

Meanwhile, it has been described that the electronic apparatus 200 is a smart phone in FIG. 1, but it is not limited thereto, and the electronic apparatus 200 may be implemented as various types of electronic apparatuses which include a camera and a display such as a tablet, a digital camera, a camcorder, a PDA and the like.

Hereinafter the method for the electronic apparatus 200 to generate and display the guide information will be described in detail with reference to drawings.

Figure 2:
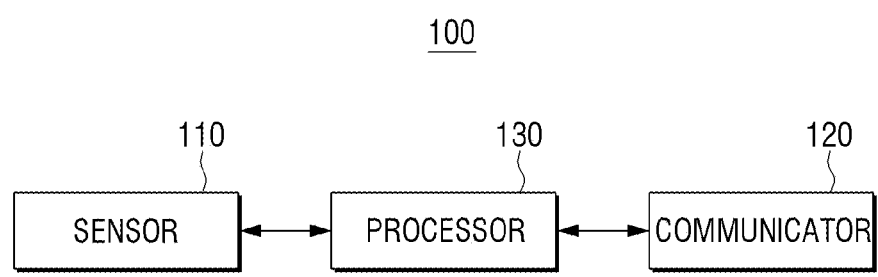
FIG. 2 is a block diagram illustrating a cleaner according to an embodiment.

FIG. 2 is a block diagram illustrating a cleaner according to an embodiment.

Referring to FIG. 2, the cleaner 100 may include a sensor 110, a communicator 120, and a processor 130.

The sensor 110 may sense the location of the cleaner 100. Specifically, the sensor 110 may be implemented as a geomagnetic sensor, and sense the location of the cleaner 100 by sensing the change of a magnetic field according to the movement of the cleaner 100. However, it is not limited thereto, and the sensor 110 may be implemented as various types of sensors which may sense the location of the cleaner 100. For example, the sensor 110 may be a RSSI (Receive Signal Strength Indicator) distance positioning sensor based on a wireless signal intensity.

Meanwhile, the sensor 110 may be embedded in the head of the cleaner 100. Accordingly, the sensor 110 may especially sense the position in which a head is located among the compositions of the cleaner 100. However, the sensor 110 does not necessarily have to be included in the head of the cleaner 100, and the sensor 110 may be detached from the head of the cleaner.

The communicator 120 may receive and transmit various data by performing communication with the electronic apparatus 200. Especially, the communicator 120 may transmit the information on the location of the cleaner 100 to the electronic apparatus 200.

The network which may be used by the communicator 120 to communicate with the electronic apparatus 200 is not limited to a specific method. For example, the communicator 120 may use a wireless communication network such as Wi-Fi, Bluetooth and the like for communicating with the electronic apparatus 200. For this, the communicator 120 may include a Wi-Fi chip, a Bluetooth chip, a wireless chip and the like.

Meanwhile, the cleaner 100 may be connected to the electronic apparatus 200 in a wired manner and perform a communication.

For this, the cleaner 100 may further include an interface (not illustrated) for the wired connection. Specifically, the interface (not illustrated) may be realized in a docking interface, and in this case, the cleaner 100 may further include a data input and output connector for connecting with the electronic apparatus 200 and for receiving and transmitting data. Here, the docking interface may be realized in a form in which the electronic apparatus 200 may be attached to the main body of the cleaner 100.

Meanwhile, here, merely an embodiment of a method has been described, the method that the cleaner 100 performs communication with the electronic apparatus 200 in a wired or wireless method for receiving and transmitting data, and the method for the cleaner 100 to communicate with the electronic apparatus 200 for receiving and transmitting data is not limited to a specific method. For example, the cleaner 100 may be connected to the electronic apparatus 200 through a cable for receiving and transmitting data.

The processor 130 controls overall operations of the cleaner 100. For example, the processor 130 may control hardware or software elements connected to the processor 130 by driving an O/S or an application program, and process or compute various data. Further, the processor 130 may load and process a command or data received from at least one of the other components to a volatile memory, and store diverse data in a non-volatile memory.

For this operation, the processor 130 may be realized as a dedicated processor for performing the corresponding functions (for example, an embedded processor) or a generic-purpose processor for performing the corresponding functions by running one or more software programs stored in a memory device (for example, a CPU or an application processor).

The processor 130 may control the communicator 120 to transmit the information on the location of the cleaner 100 to the electronic apparatus 200. As described above, here, the information on the location of the cleaner 100 may be the information generated by being sensed by the sensor 110 such as a geomagnetic sensor.

Figure 3:
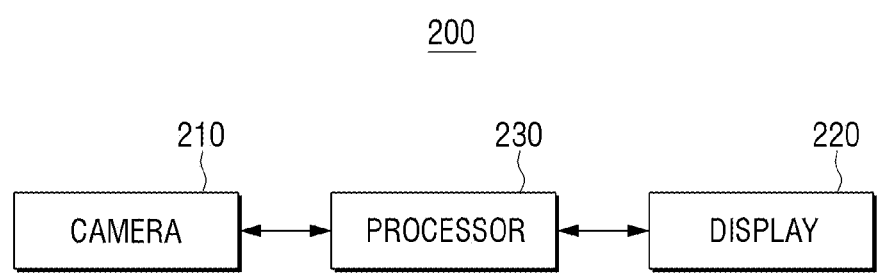
FIG. 3 is a block diagram illustrating an electronic apparatus according to an embodiment.

FIG. 3 is a block diagram illustrating an electronic apparatus according to an embodiment.

Referring to FIG. 3, the electronic apparatus 200 may include a camera 210, a display 220 and a processor 230. Here, the electronic apparatus 200 may provide guide information which includes direction information for moving the cleaner 100 to a specific direction using the location information of the cleaner 100 received from the cleaner 100.

Hereinafter the method for the electronic apparatus 200 to provide cleaning guide information will be described with reference to FIGS. 4 to 10.

The camera 210 may be installed in the electronic apparatus 200 and photograph an external image. In this case, the external image may be a stopped image or a moving image.

In addition, the camera 210 may be implemented as a plurality of numbers of cameras such as a front camera installed at the front portion of the electronic apparatus 200 and a rear camera installed at the rear portion of the electronic apparatus 200.

The camera 210 may include a lens and an image sensor. Here, the lens may be a general lens widely used, a wide-angel lens, a zoom lens and the like, and an image sensor may be a CMOS (Complementary Metal Oxide Semiconductor) and a CCD (Charge Coupled Device), etc.

In particular, the camera 210 may photograph a peripheral area of the cleaner 100. Here, the camera 210 may photograph the peripheral area in a state in which the electronic apparatus 200 is attached to the cleaner 100.

Figure 4:
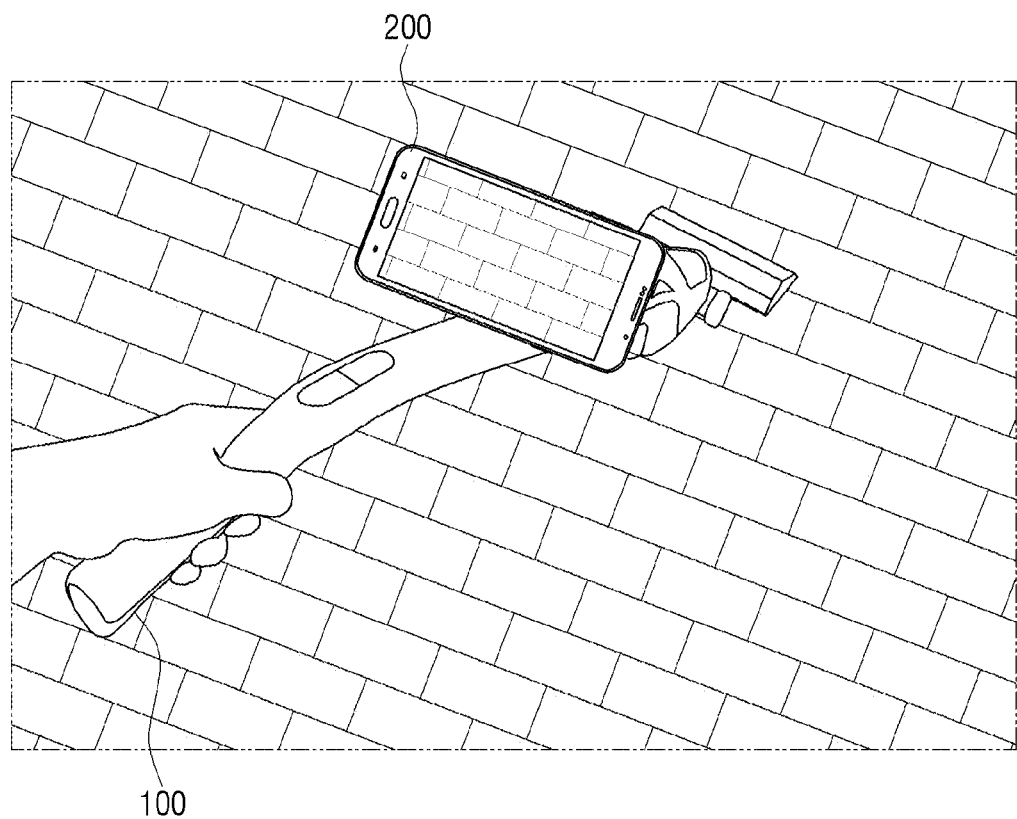
FIG. 4 is a view illustrating a method for an electronic apparatus to photograph a peripheral area of a cleaner according to an embodiment.

For example, referring to FIG. 4, the electronic apparatus 200 may be attached to the cleaner 100 with a holder, and in this case, the camera 210 may photograph the peripheral area of the cleaner 100 through a rear camera.

However, the camera 210 does not necessarily clean the peripheral area of the cleaner 100 only in a state in which the electronic apparatus 200 is attached to the cleaner 100, and the camera 210 may photograph the peripheral area of the cleaner 100 in a state in which the electronic apparatus 200 is detached from the cleaner 100, that is, in a state in which a user is holding the electronic apparatus 200 with a hand.

In addition, needless to say, the camera 210 may photograph an entire area to be cleaned including the peripheral area of the cleaner 100, in addition to the peripheral area of the cleaner 100.

The display 220 may display various images. Here, the image is a concept which includes a stopped image and a moving image, and the moving image may be a second dimensional image and the three dimensional AR (augmented reality) image in which a real world and a virtual object are overlapped.

Especially, the display 220 may display the image of the peripheral area of the cleaner 100 photographed through the camera 210.

For example, referring to FIG. 4, the electronic apparatus 200 may be attached to the cleaner 100 with a holder, and in this case, the display 220 may display the image of the peripheral area of the cleaner 100 according to that the camera 210 photographs the peripheral area of the cleaner 100 through the rear camera.

However, it is not limited thereto, and the display 220 may display the image of the peripheral area of the cleaner 100 according to that the camera 210 photographs the peripheral image of the cleaner 100 in a state in which the electronic apparatus 200 is detached from the cleaner 100, that is, while a user holds the electronic apparatus 200.

In addition, according to that the camera 210 photographs the entire area to be cleaned which includes the peripheral area of the cleaner 100, the display 220 may display the entire area to be cleaned which includes the peripheral area of the cleaner 100.

For this, the display 220 may be realized as various kinds of displays, such as Liquid Crystal Display (LCD), Organic Light-Emitting Diode (OLED), Liquid Crystal on Silicon (LCoS), Digital Light Processing (DLP), or the like. Further, the display 220 may further include a driver circuit that may be realized as a-si TFT, low temperature poly silicon (LTPS), TFT, or OTFT (organic TFT) and a backlight unit.

Hereinafter an embodiment will be explained focusing on the case in which the electronic apparatus 200 is attached to the cleaner 100, for convenience of explanation.

The processor 230 controls overall operations of the electronic apparatus 200. For example, the processor 230 may control hardware or software elements connected to the processor 230 by driving an O/S or an application program, and process or compute various data. Further, the processor 230 may load and process a command or data received from at least one of the other components to a volatile memory, and store diverse data in a non-volatile memory.

For this operation, the processor 130 may be realized as a dedicated processor for performing the corresponding functions (for example, an embedded processor) or a generic-purpose processor for performing the corresponding functions by running one or more software programs stored in a memory device (for example, a CPU or an application processor).

First, the processor 230 may control the display 220 to display the image photographed through the camera 210.

Here, the image photographed through the camera 210 may be the image of the peripheral area of the cleaner 100, or the image of the entire cleaning area.

In addition, the processor 230 may receive a user input for selecting the cleaning object in the displayed image.

Here, the cleaning object may be the area in which a cleaning operation will be performed by using the cleaner 100. For example, if the area to be cleaned is a floor in a house, the cleaning object may be the floor.

Meanwhile, the selecting of the cleaning object may be performed in the photographed image of the peripheral area of the cleaner 100, and performed in the photographed image of the entire area to be cleaned.

Figure 5:
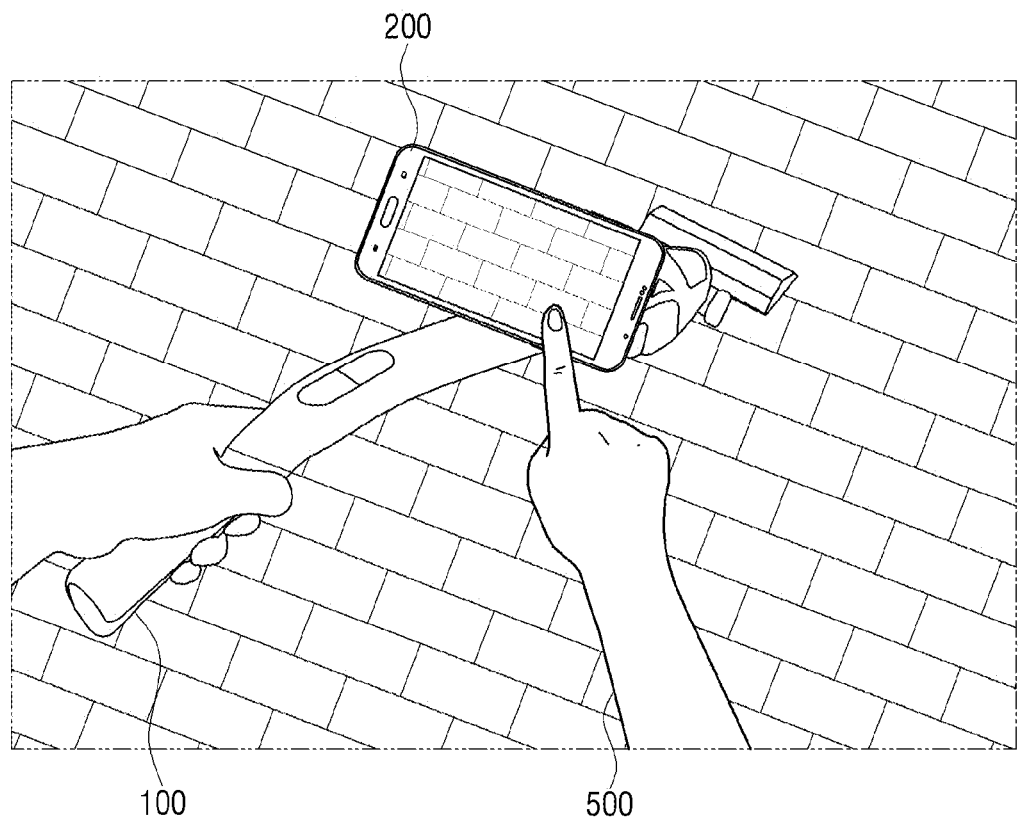
FIGS. 5 and 6 are views illustrating a method for selecting an object to be cleaned by a cleaner according to an embodiment.
Figure 6:
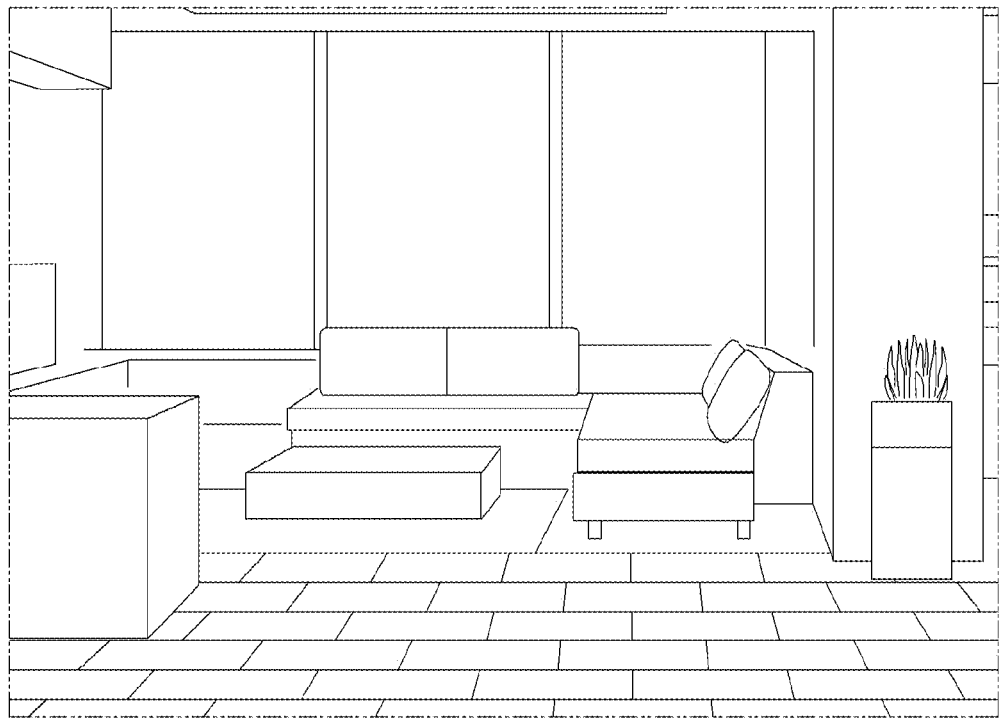
Figure 6:
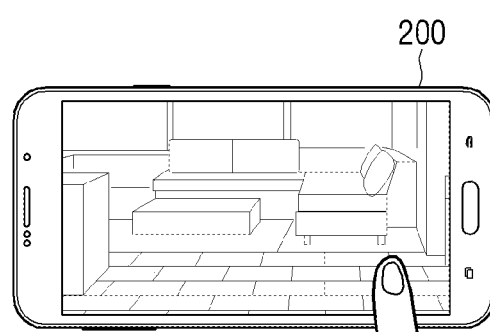
Figure 6:

With regard to the above, the explanation will be provided with reference to FIGS. 5 and 6.

FIGS. 5 and 6 are drawings illustrating a method for selecting an object to be cleaned by the cleaner according to an embodiment.

First, as illustrated in FIG. 5, in a case in which the electronic apparatus 200 is uses by being attached to the cleaner 100, the processor 230 may display the image of the peripheral area of the cleaner 100.

Here, if a user performs a user input 500 of touching a display 220, the processor 230 may determine the touched area, that is, a floor, to be the object to be cleaned.

Meanwhile, as illustrated in FIG. 6, if the entire area to be cleaned is photographed while the electronic apparatus 200 is detached from the cleaner 100, that is, while a user holds the electronic apparatus 200 with a hand, the processor 230 may display the image which includes the entire area to be cleaned.

Here, if a user performs a user input 600 of touching the portion corresponding to a floor in the displayed image, the processor 230 may determine the floor, which is the touched area, as an object to be cleaned.

Meanwhile, it has been described that the cleaning object is selected by a touch, but it is not limited thereto, and a user input may be performed with various methods which may designate a specific area such as a touch and drag operation or a gesture operation.

In addition, the processor 230 may determine the pattern of the cleaning object selected according to the user input.

For this, the electronic apparatus 200 may further include a shape recognition module (not illustrated). In detail, the processor 230 may determine the location of dots existing at the touched point, using the shape recognition module (not illustrated), determine a geometrical shape of a trajectory consisting of the dots, and determine the geometrical shape as a pattern of the cleaning object.

In addition, if the user operation is performed by a touch and drag operation, the processor 230 may determine the geometrical shape of the trajectory according to the drag operation, and determine the geometrical shape as the pattern of the cleaning object.

Subsequently, the processor 230 may determine the area which has the same pattern as the pattern of the cleaning object selected according to the user input in the photographed image of the peripheral area of the cleaner 100.

For example, if the touched area has a circle repeatedly, the processor 230 may determine the area which has the circle repeatedly in the photographed image of the peripheral area as the area which has the same pattern, and if the dragged area is in a shape of square, the processor 230 may determine the area of which shape is square in the photographed image of the peripheral area of the cleaner 100 as the area which has the same pattern.

For this, the processor 230 may use the shape recognition module (not illustrated). Specifically, the processor 230 may analyze the location of the dots included in the photographed image of the peripheral area of the cleaner 100 using the shape recognition module (not illustrated), and determine the geometrical shape of the trajectory consisting of the dots. Also, if the determined geometrical shape is the same as the area selected by a user, that is, as the pattern of the cleaning object, the processor 230 may determine the area which has the corresponding geometrical shape, as the area which has the same pattern as the cleaning object.

Subsequently, the processor 230 may display a mark on the area which has the same pattern as the cleaning object in the photographed image.

The above will be described with reference to FIG. 7.

FIG. 7 is a view illustrating a method for displaying a mark on an area which has the same pattern as the object to be cleaned by a cleaner according to an embodiment.

Figure 7A:
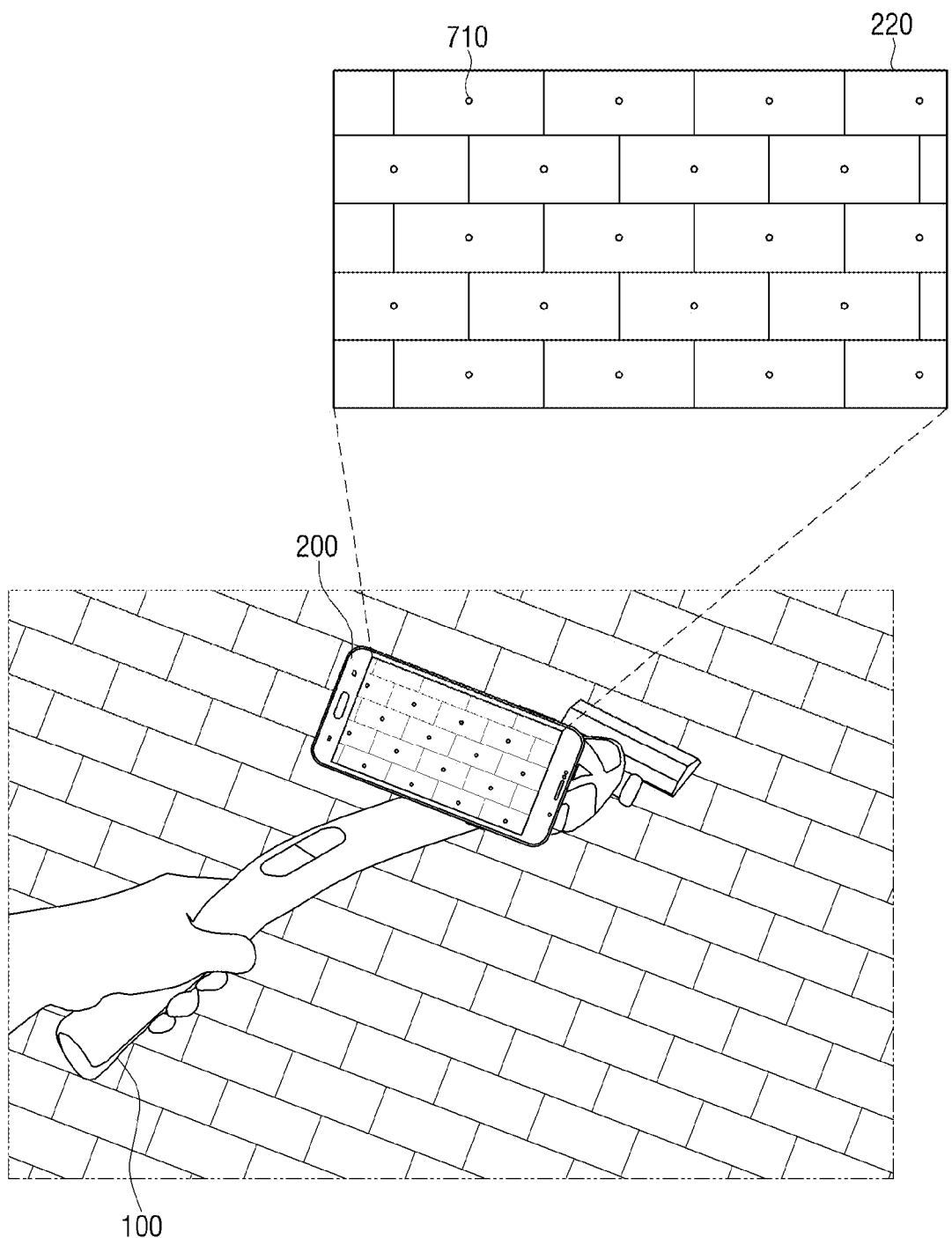
FIG. 7A and FIG. 7B are a view illustrating a method for displaying a mark on an area which has the same pattern as an object to be cleaned by a cleaner according to an embodiment.

As illustrated in FIG. 7A, the pattern of the area selected as the cleaning object may have a square-shaped pattern. Accordingly, the processor 230 may display a mark 710 on the area which has the square-shaped pattern in the image of the peripheral area of the cleaner 100 photographed through the camera.

Meanwhile, in FIG. 7A, the shape of the mark 710 is displayed as a circle, but it is not limited thereto, and the shape may be displayed in various types such as triangle, square, pentagram and the like.

Figure 7B:
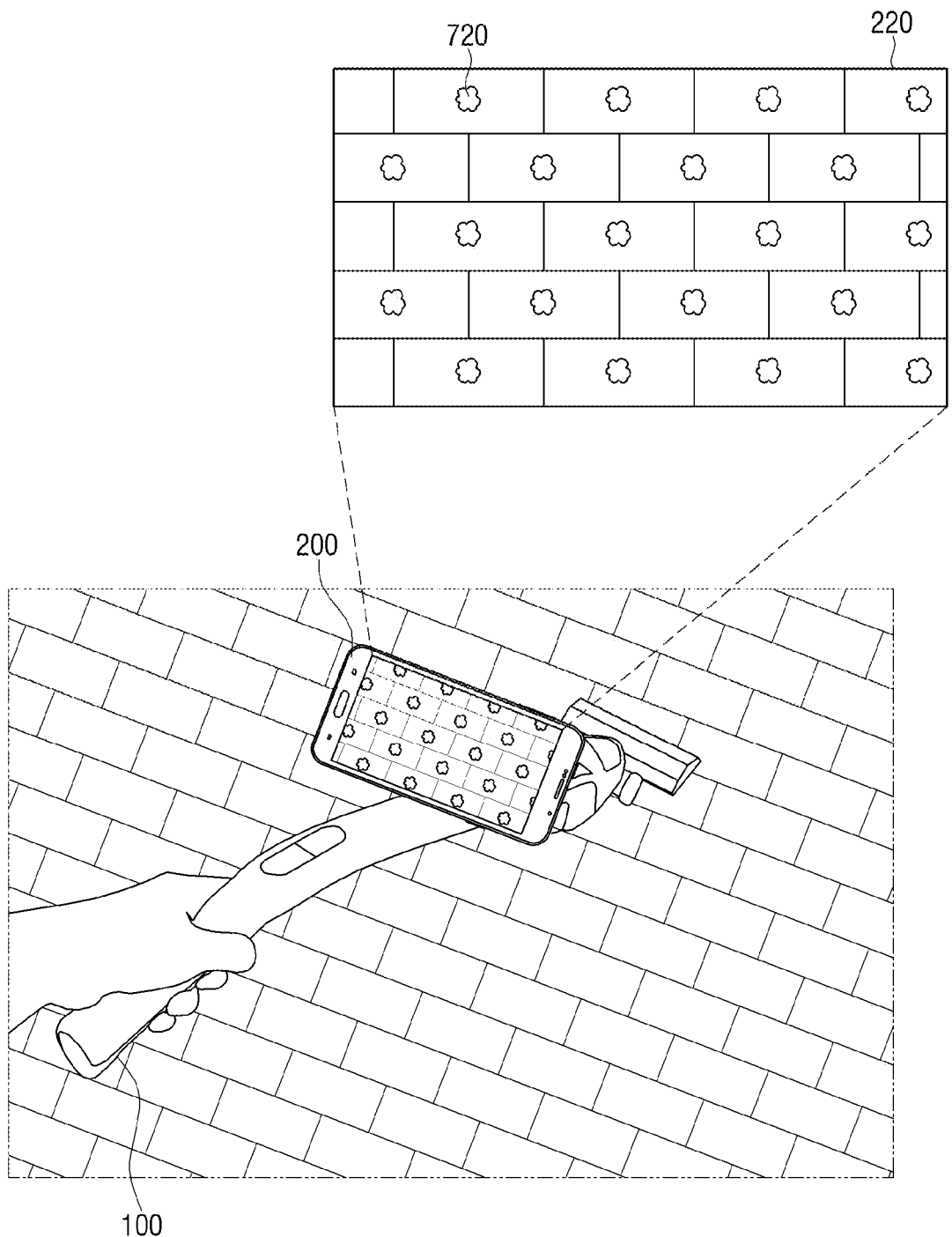

In addition, as illustrated in FIG. 7B, the mark may be an augmented reality (AR) mark 720 in a shape of dust.

That is, the processor 230 may synthesize the AR mark 720 into the image photographed through the camera 210 and display the synthesized AR mark using the AR technology. For this, the electronic apparatus 200 may further include AR content-image matcher for matching the image photographed in real time and AR contents.

Meanwhile, the processor 230 may determine the area which has the same pattern as the cleaning object in the image photographed in real time, and display a mark on the corresponding area.

Specifically, the electronic apparatus 200 attached to the cleaner 100 may move according to the movement of the cleaner 100, and accordingly, the camera 210 may photograph the peripheral area of the moving cleaner 100 in real time. Here, a new area which was not displayed previously may be displayed in the image photographed in real time according to the movement of the cleaner 100, and the processor 230 may determine whether the pattern of the new area is the same as the pattern of the cleaning object, and if it is determined that the patterns are the same, the processor 230 may display a mark on the corresponding new area.

Thereafter, the processor 230 may display guide information for guiding the movement of the cleaner 100 to the area in which the mark is displayed.

Here, the guide information may include the information on the moving direction for moving the cleaner 100 to the area in which a mark is displayed.

For this, first, the processor 230 may determine the location of the area in which the mark is displayed, using the location information of the electronic apparatus 200.

Figure 8:
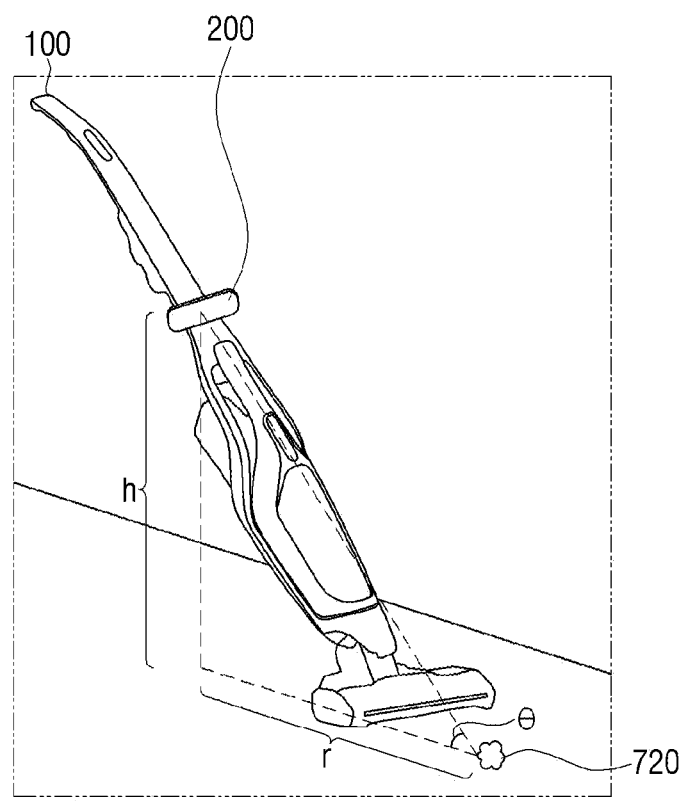
FIG. 8 is a view illustrating a method for an electronic apparatus to determine a location in which a mark is displayed according to an embodiment.

Specifically, referring to FIG. 8, the processor 230 may determine the height (h) of the electronic apparatus 200 from a floor in consideration of the location where the electronic apparatus 200 is attached to the cleaner 100, and determine the angle (θ) between the electronic apparatus 200 and a floor in consideration of the tilted degree of the electronic apparatus 200. In addition, the processor 230 may determine the distance (r) from the electronic apparatus 200 to the point in which the mark 720 is displayed, by using the height (h) of the electronic apparatus 200 and the angle (θ) between the electronic apparatus 200 and a floor, and determine the location in which the mark is displayed by using the location information of the electronic apparatus 200 and the distance (r) from the electronic apparatus 200 to the point in which the mark 720 is displayed.

For this, the electronic apparatus 200 may include a height sensor for measuring the height of the electronic apparatus 200 and a tilt angle sensor and an angle sensor for measuring the angle of the electronic apparatus 200, and further includes a geomagnetic sensor for generating the location information of the electronic apparatus 200 and a RSSI distance positioning sensor base on a wireless signal intensity.

In addition, the processor 230 may determine the moving distance and the moving direction for moving the cleaner 100 to the area in which a mark is displayed, using the location information of the cleaner 100.

Specifically, the processor 230 may determine the moving distance and the moving direction for moving the cleaner 100 from the location in which the cleaner 100 is currently located to the location in which the mark is displayed, using the current location information of the cleaner 100 and location information of the mark.

Meanwhile, the location information of the cleaner 100 may be received from the cleaner 100. For this, the electronic apparatus 200 may further include a communicator (not illustrated) which may receive and transmit various data by performing communication with the cleaner 100. Here, the network which may be used by the communicator (not illustrated) for performing communication with the cleaner 100 is not limited to a specific method. Specifically, the communicator (not illustrated) may use a short distance communication network such as Wi-Fi, Bluetooth for performing communication with the cleaner 100. For this, the communicator (not illustrated) may include a Wi-Fi chip, a Bluetooth chip, a wireless communication chip and the like.

Meanwhile, the guide information displayed on the electronic apparatus 200 may be a two dimensional image and the three dimensional AR image in which a real world and a virtual object are overlapped.

This will be illustrated with reference to FIG. 9.

FIG. 9 is a view illustrating guide information for guiding a movement of a cleaner displayed on an electronic apparatus according to an embodiment.

Figure 9A:
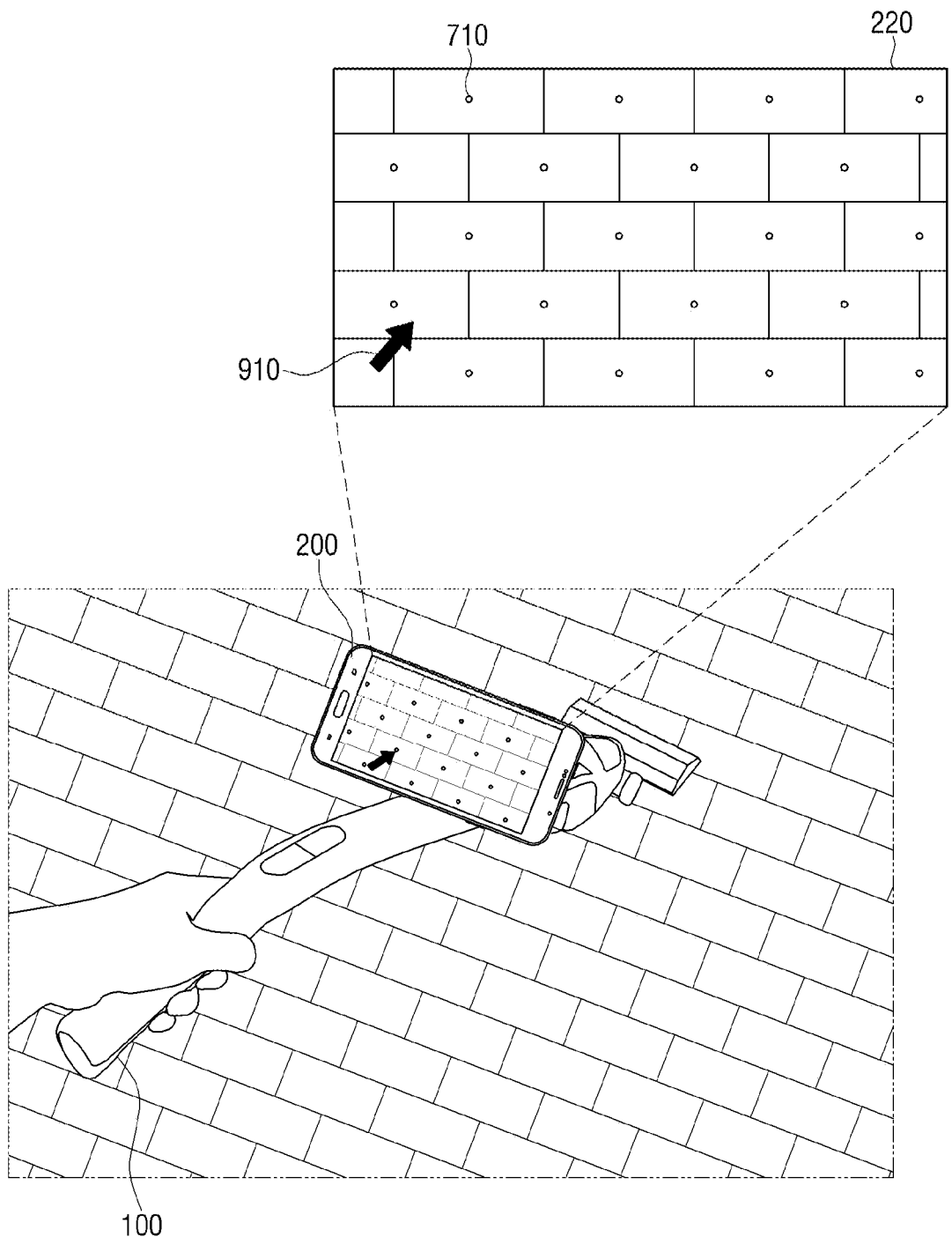
FIG. 9A and FIG. 9B are a view illustrating guide information for guiding a movement of a cleaner displayed on an electronic apparatus according to an embodiment.

As illustrated in FIG. 9A, the guide information displayed on the electronic apparatus 200 may be in a shape of two dimensional arrow. Here, the processor 230 may display the arrow 910 which guides the movement of the cleaner 100 to the location in which a mark 710 is displayed, based on the location information of the mark 710 and the cleaner 100, as illustrated above.

Figure 9B:
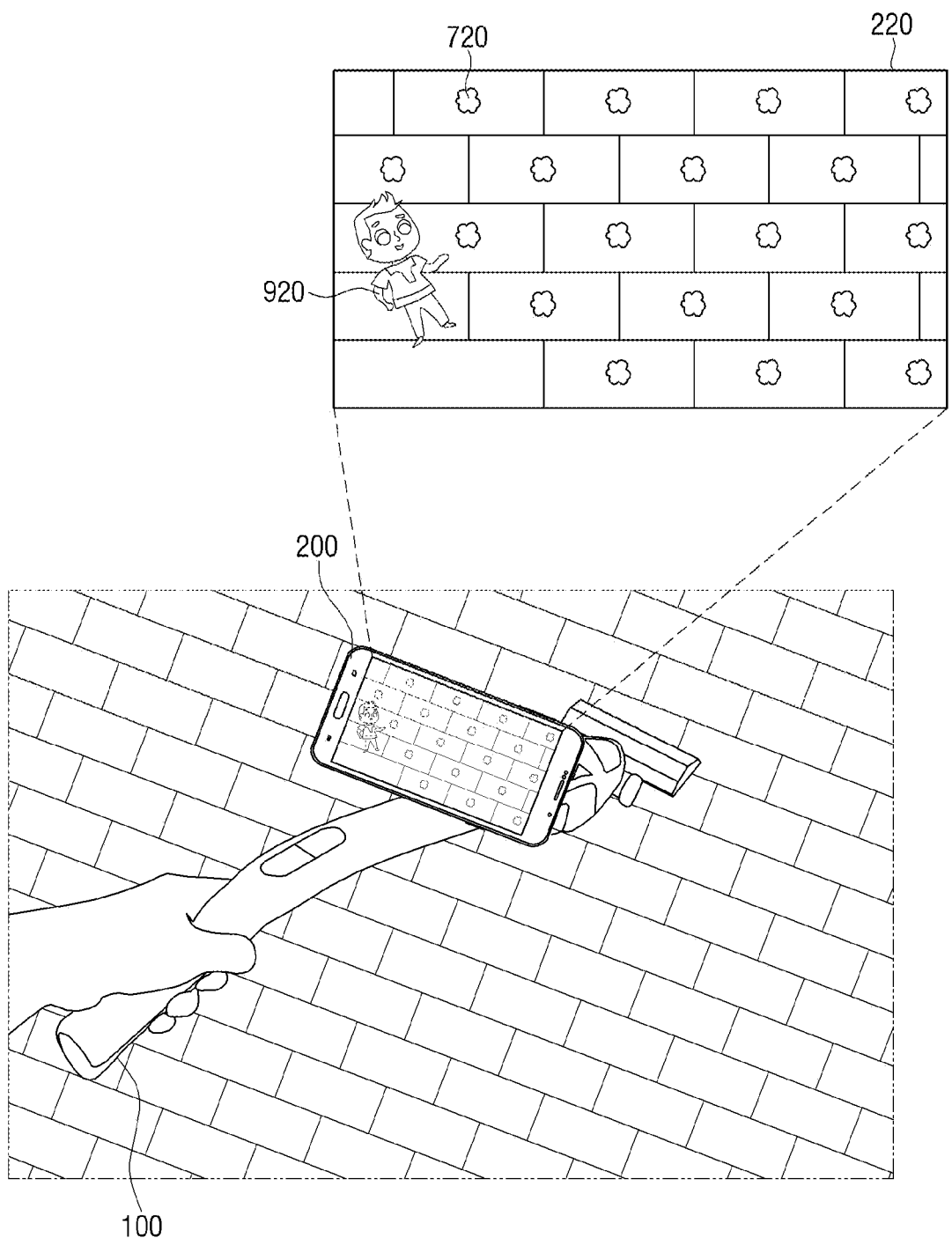

In addition, as illustrated in FIG. 9B, the guide information may be a three dimensional AR character 920. Here, the processor 230 may display the AR character 920 which is in a form of guiding the movement of the cleaner 100 to the location in which the mark is displayed, based on the location information of the mark 720 and the cleaner 100, as illustrated above.

Meanwhile, only the AR character 920 is illustrated in FIG. 9B, but a speech bubble may be displayed together with the AR character 920 for the guide information. For example, the speech bubble such as "come here" may be displayed together with the AR character 920 which points the marked location.

Meanwhile, the guide information displayed on the electronic apparatus 200 does not necessarily be limited to the above mentioned embodiment, and the guide information may be implemented in various forms which may guide the movement of the cleaner 100 to the location in which the mark is displayed.

Accordingly, a user may perform the cleaning operation according to the displayed guide information, and thus the cleaning operation may be performed as an operation which provides an amusement, not as a boring operation.

Subsequently, if it is determined that the cleaner 100 has passed the area in which a mark is displayed, the processor 230 may remove the mark displayed on the area where the cleaner 100 has passed.

This will be described with reference to FIG. 10.

FIG. 10 is a view illustrating a method for an electronic apparatus to determine whether a cleaner has passed an area in which a mark is displayed, in a photographed image according to an embodiment.

Here, the processor 230 may determine whether the cleaner 100 passed the area in which the mark is displayed, based on the location information of the cleaner 100 received from the cleaner 100.

Specifically, the processor 230 may determine whether the cleaner 100 passed the area in which the mark is displayed, based on the location information of the point in which the mark is displayed which is determined based on the location information of the electronic apparatus 200, and the location information of the cleaner 100 received from the cleaner 100.

Figure 10A:
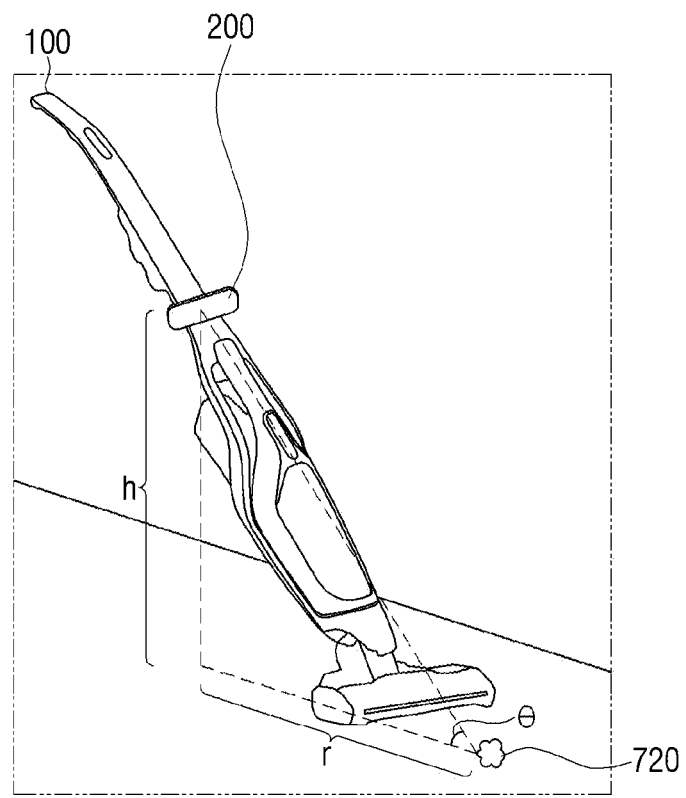
FIG. 10A and FIG. 10B are a view illustrating a method for an electronic apparatus to determine whether a cleaner has passed an area in which a mark is displayed, in a photographed image according to an embodiment.

More specifically, referring to FIG. 10A, a location sensing sensor of the cleaner 100 may be embedded in or attached to the head of the cleaner 100. The processor 230 may compare the location information of the head of the cleaner sensed in the location sensing sensor of the cleaner 100 and the location information of the mark 720, and if it is determined that each of the location information is identical to each other, the processor 230 may determine that the cleaner 100 passed the area in which the mark is displayed.

Meanwhile, the processor 230 may analyze the image captured through the camera 210 and determine whether the cleaner 100 passed the area in which the mark is displayed.

Figure 10B:
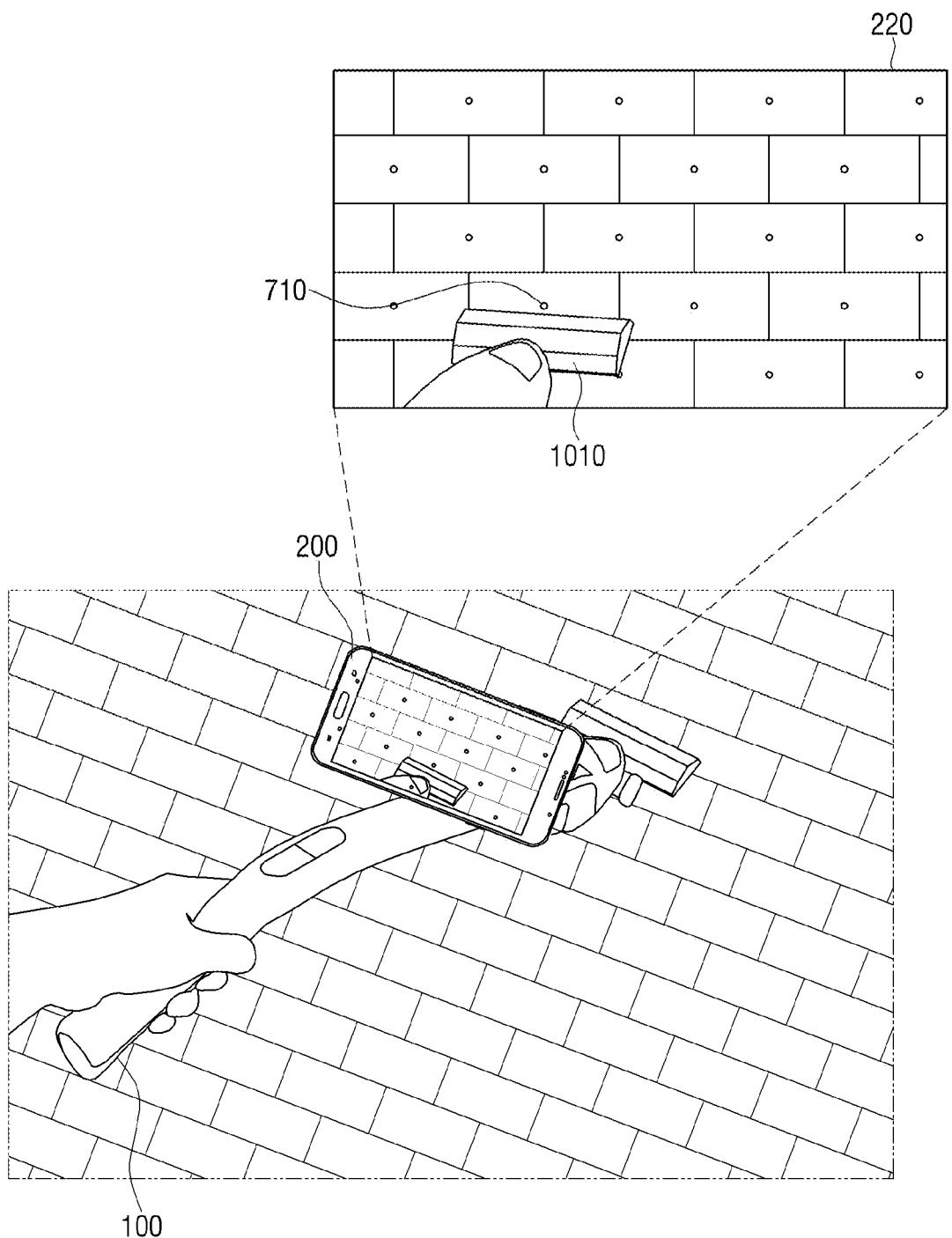

For example, referring to FIG. 10B, a head 1010 of the cleaner and a mark may be displayed in the image photographed through the camera 210. Here, the processor 230 may determine whether the head 1010 of the cleaner contacted the mark 710 by analyzing the image.

Specifically, the electronic apparatus 200 may store the shape information with regard to the head 1010 of the cleaner, and after recognizing the same shape as the pre-stored head 1010 of the cleaner in the photographed image by using the shape recognition module (not illustrated), the processor 230 may determine whether the recognized shape contacted the mark.

Meanwhile, the shape of the head 1010 of the cleaner does not necessarily be pre-stored, and if the head 1010 of the cleaner is selected according to the user operation in the photographed image, the shape of the head 1010 of the cleaner may be recognized by the shape recognition module (not illustrated), and accordingly, the processor 230 may determine whether the shape of the head 1010 of the cleaner contacted the mark, in the photographed image.

In this case, if the head 1010 of the cleaner is determined to contacted the mark 710, the processor 230 may determine that the cleaner 100 passed the area in which the mark is displayed, and moved.

Meanwhile, it has been described that if the cleaner 100 passes the area in which a mark is displayed and moves, the processor 230 removes the mark, but it is not necessarily limited thereto, and if it is determined that the cleaner 100 has passed the area in which the mark is displayed, the processor 230 may display a new mark. For example, a check mark, not the circle mark, may be displayed.

Meanwhile, even if the area which has the same pattern as the cleaning object is photographed in real time according to the movement of the cleaner 100 in the image photographed through the camera 210, the processor 230 may not display the mark if the corresponding area is determined to be the area where the cleaner 100 has passed previously.

For this, the processor 230 may store the location information of the cleaner 100 in real time. Specifically, the processor 230 may receive the location information of the cleaner 100 from the cleaner 100, and store the moving rout of the cleaner 100 in real time based on the received location information. In addition, if it is determined that the cleaner 100 passes again the area which has been passed, the processor 230 may not display the mark even if the area which has the same pattern as the cleaning object in the image photographed through the camera 210 is photographed.

Accordingly, different from the case of using a cleaner in the related art, in an embodiment, a user may recognize the cleaned area clearly, by using the cleaner to which the electronic apparatus 200 is attached, and accordingly, the extension of the cleaning time according to that the same area is cleaned again may be prevented.

Meanwhile, the processor 230 may generate a cleaning map based on the moving rout determined based on the location information of the cleaner 100.

As described above, the processor 230 may store the location information of the cleaner 100 in real time, and generate the cleaning map based on the moving route determined according to the location information.

Figure 11:
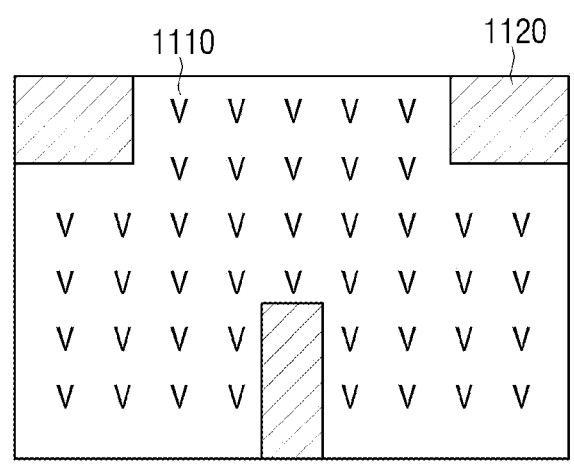
FIG. 11 is a view illustrating a method for an electronic apparatus to generate a cleaning map and to provide guide information based on the generated cleaning map according to an embodiment.

For example, as illustrated in FIG. 11, the processor 230 may display the moving area as a mark 1110 in a shape of check based on the moving route of the cleaner 100, and display the area in which the cleaner does not pass in a shape of a black box 1120. Here, the portion displayed with the black box may be a furniture, electronic goods and the like existing in a house.

Meanwhile, such cleaning map is merely an embodiment, and the cleaning map may be generated in various ways according to the moving route of the cleaner 100.

In addition, the processor 230 may display the guide information regarding the moving direction of the cleaner 100 based on the generated cleaning map.

Here, the guide information may include the information on the moving direction of the cleaner 100, and especially, the processor 230 may include guide information which guides the movement of the cleaner 100 to the direction which may shorten the time consumed for performing the cleaning operation based on the cleaning map.

Specifically, the processor 230 may display the guide information which causes the cleaner 100 to complete the cleaning operation without passing one mark repeatedly, using the location information of the mark stored in the process of generating the cleaning map.

For example, if the cleaning map as in FIG. 11 has been generated, the processor 230 may shorten the cleaning time by generating the guide information which guides the cleaner 100 to move to one mark 1110 for one time. Meanwhile, according to the starting point of the cleaning, if the cleaner necessarily has to pass one mark 1110 for more than one time to complete the cleaning operation, the processor 230 may display the guide information which causes the cleaner to complete the cleaning operation by passing the mark 1110 for the least time.

Figure 12:
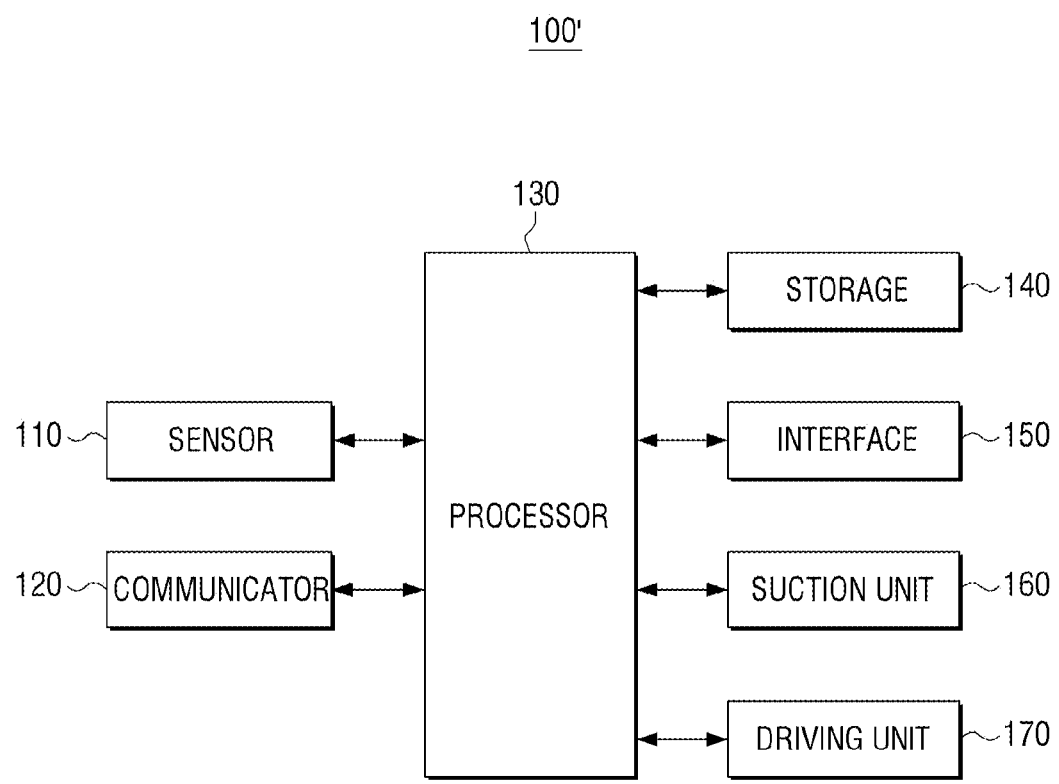
FIG. 12 is a detailed block diagram illustrating a cleaner according to an embodiment.

FIG. 12 is a detailed block diagram illustrating a cleaner according to an embodiment.

Referring to FIG. 12, a cleaner 110' may include the sensor 110, the communicator 120, the processor 130, the storage 140, an interface 150, a suction unit 160, and a driving unit 170. Hereinafter the description overlapped with the above description will be omitted or abbreviated.

The storage 140 may store various programs and data required for the operation of the cleaner 100'. Especially, the storage 140 may store the cleaning map provided from the electronic apparatus 200. For this, the storage 140 may be implemented to be non-volatile memory, volatile memory, flash memory, hard disk drive (HDD) or solid state drive (SSD).

The interface 150 may include a plurality of function keys with which the user may set or select various functions supported by the cleaner 100'. The interface 150 may be implemented as an apparatus such as a plurality of buttons, and may also be implemented as a touch screen that can simultaneously perform the function of the display.

The interface 150 may receive on/off commands and a suction mode change command of the cleaning function of the cleaner 100'. Especially, the interface 150 may receive the user command for communicating with the electronic apparatus 200. Specifically, the interface 150 may receive the user command for a communication connection with the electronic apparatus 200, and accordingly, the processor 130 may control the communicator 120 to perform a communication with the electronic apparatus 200.

The suction unit 160 may suck the dust at the floor surface of the cleaner 100'. Specifically, the suction unit 160 may perform a cleaning operation by sucking the foreign materials at the lower part of the head of the cleaner 100 while moving or stopping. The suction unit 160 may further include an air cleaning unit which cleans contaminants in the air.

The suction unit 160 may have a plurality of operation modes. Here, the operation mode may be divided according to the suction intensity. For example, the operation mode may be divided into 1~5 according to the suction intensity, and the higher value may have the stronger suction intensity.

The driving unit 170 may move the cleaner 100'. The driving unit 170 may be one or more than one wheels.

The processor 130 controls overall operations of the cleaner 100'. Especially, the processor 130 may control the communicator 120 for performing a network connection with the electronic apparatus 200 and transmit the location information of the cleaner 100' to the electronic apparatus 200.

Figure 13:
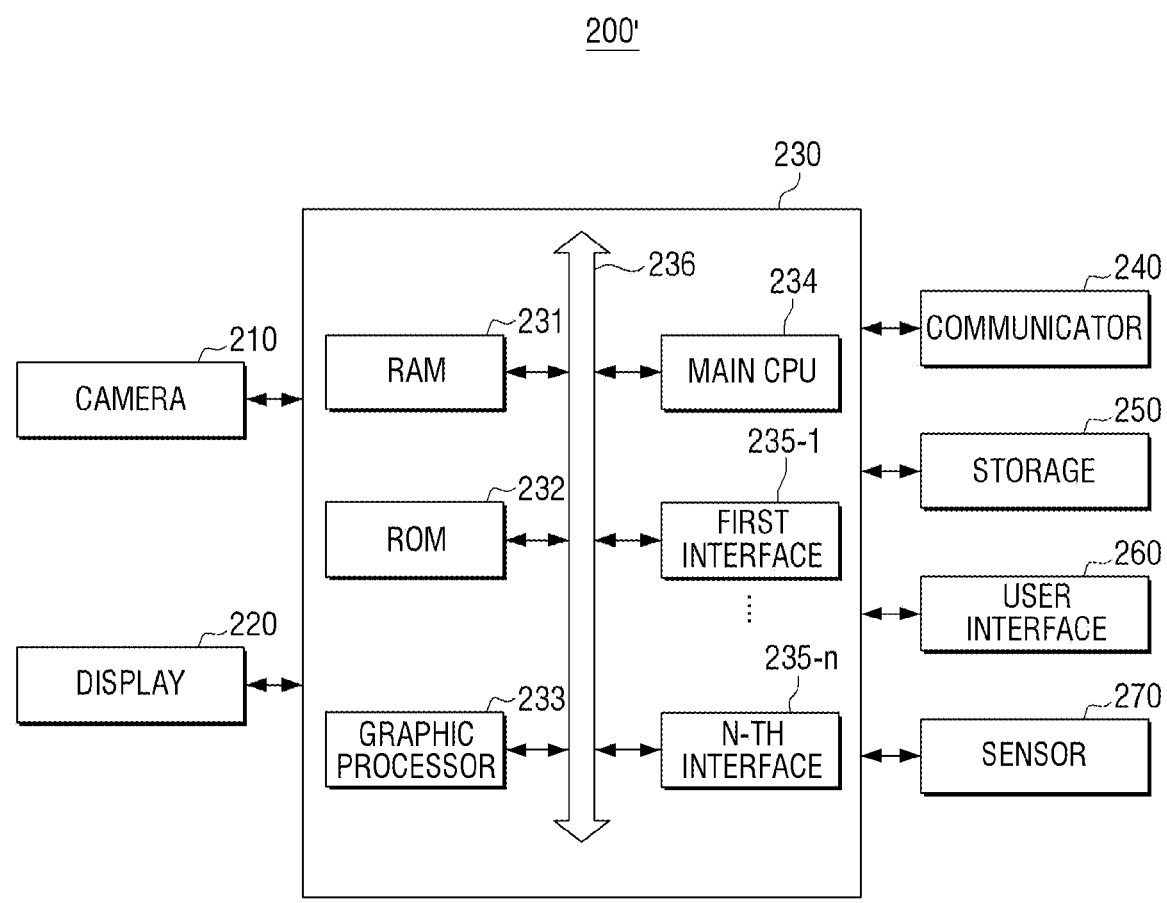
FIG. 13 is a detailed block diagram illustrating an electronic apparatus according to an embodiment.

FIG. 13 is a detailed block diagram illustrating an electronic apparatus according to an embodiment.

Referring to FIG. 13, the electronic apparatus 200' may include the camera 210, the display 220, the processor 230, the communicator 240, the storage 250, a user interface 260, and a sensor 270.

The storage 250 may store an operating system (OS) for controlling the overall operations of the components of the electronic apparatus 200', and the command or data related to the components of the electronic apparatus 200'.

Accordingly, the processor 230 may control a plurality of hardware or software components of the electronic apparatus 200' by using various commands or data stored in the storage 250, and load the command or data received from at least one of the other components to a volatile memory and process the loaded command or data, and store the various data in a non-volatile memory.

The user interface 260 receives various user commands. Specifically, the user interface 260 may receive a user command regarding various UI screens for controlling the function of the electronic apparatus 200' provided through the display 220. Especially, if the user interface 260 is implemented through the display 220, a user command of selecting a cleaning object may be input to the user interface 260.

The sensor 270 may sense the location of the electronic apparatus 200'. Specifically, the sensor 270 is implemented in a geomagnetic sensor and sense the location of the electronic apparatus 200' by sensing the change of the magnetic field according to the movement of the electronic apparatus 200'. However, it is not limited thereto, and the sensor 270 may be implemented in various types of sensors which may sense the location of the electronic apparatus 200'. For example, the sensor 270 may be an RSSI distance positioning sensor based on a wireless signal intensity.

In addition, the sensor 270 may sense the movement of the electronic apparatus 200'. Specifically, the sensor 270 may be implemented as an acceleration sensor and sense the acceleration change according to the movement of the electronic apparatus 200', and may be implemented as a gyro sensor and sense the moving distance and the moving direction of the electronic apparatus 200' by sensing the change of the acceleration according to the rotation of the electronic apparatus 200'.

In addition, as described, the sensor 270 may be implemented as an altitude sensor for measuring the height of the electronic apparatus 200' and a tilt angle sensor and an angle sensor for measuring the angle of the electronic apparatus 200'. In addition, the sensor 270 may further include a touch sensor which senses a touch by a touch pad attached to an apparatus or a hovering manipulation, and a proximity sensor, etc.

The processor 230 controls overall operations of the electronic apparatus 200'.

Specifically, the processor 230 includes a RAM 231, a ROM 232, a graphics processor 233, a main central processing unit (CPU) 234, first through n-th interfaces 235-1~135-n, and a bus 236. Here, the RAM 231, the ROM 232, the graphic processing unit 233, the main CPU 234, the first to n-th interfaces 235-1 to 235-n, and the like may be connected to each other through the bus 236.

The first to n(th) interfaces 235-1 to 235-n may be connected to the aforementioned various components. One of the interfaces may be realized as a network interface connected to an external apparatus through a network.

The main CPU 234, by accessing the storage 250, performs booting using the O/S stored in the storage 250. The main CPU 234 may perform various operations by using various types of programs, contents, and data, etc. stored in the storage 250.

The RAM 231 may store a command set for system booting. When power is supplied to the electronic apparatus 200', the main CPU 234 copies the O/S stored in the storage 250 to the RAM 231 according to the command stored in the ROM 232 to boot the system by executing the O/S. When the booting is completed, the main CPU 234 copies various programs stored in the storage 250 to the RAM 231, and executes the programs copied in the RAM 231 to perform various operations.

The graphics processor 233 may generate a screen including various objects, such as icons, images, or text, by using a computing unit (not illustrated) and a rendering unit (not illustrated). The computing unit (not illustrated) may compute attribute values, such as coordinate values, shapes, sizes, and colors of the objects, according to a layout of the screen based on the received control command. The rendering unit (not illustrated) may generate a screen including the objects in various layouts based on the attribute values computed by the computing unit (not illustrated). The screen generated by the rendering unit (not illustrated) may be displayed in the display 220.

Figure 14:
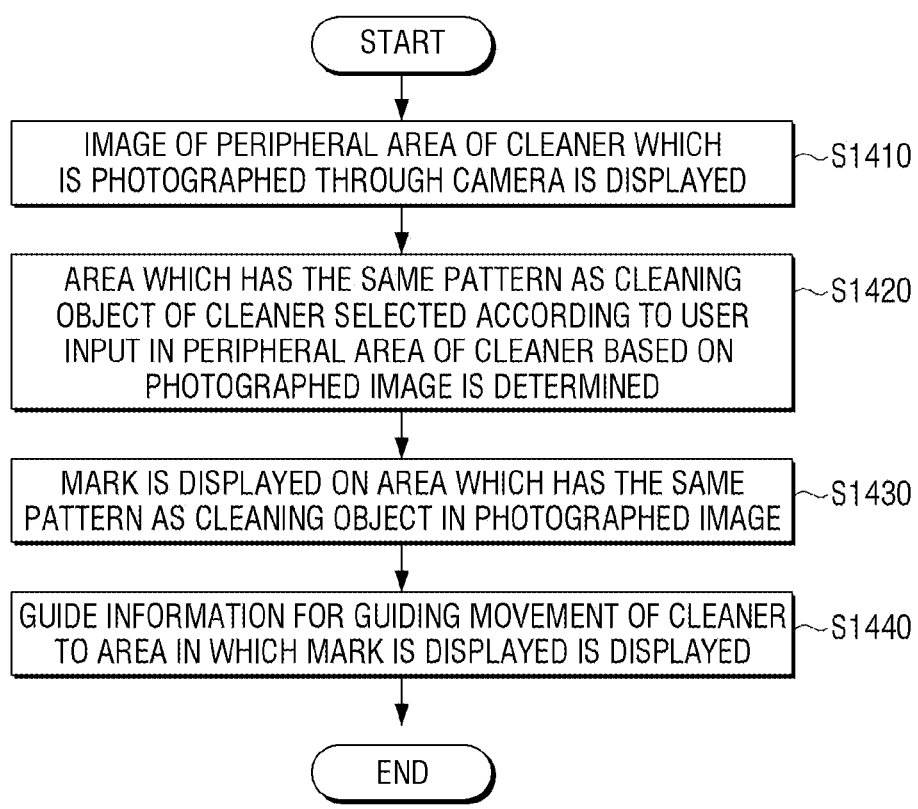
FIG. 14 is a flowchart illustrating a method for controlling an electronic apparatus according to an embodiment.

FIG. 14 is a flowchart illustrating a method for controlling an electronic apparatus according to an embodiment.

First, the electronic apparatus may display the peripheral area of the cleaner photographed through the camera in S1410.

In addition, the electronic apparatus may determine the area which has the same pattern as the cleaning object of the cleaner selected according to the user input in the peripheral area of the cleaner based on the photographed image in S1420. Specifically, the electronic apparatus may determine the pattern of the cleaning object selected in the photographed image, and determine the area which has the same pattern as the determined pattern in the photographed peripheral image of the cleaner.

In addition, the electronic apparatus may display a mark on the area which has the same pattern as the cleaning object in the photographed peripheral image in S1430. Here, the mark may be a two dimensional design or displayed as a three dimensional design by using an augmented reality technology.

In addition, the electronic apparatus may display the guide information for guiding the movement of the cleaner to the area in which the mark is displayed in S1440. Specifically, the electronic apparatus may display the guide information which guides the movement of the cleaner to the area in which the mark is displayed by using the information of the location where the mark is displayed and the information of the location where the head of the cleaner exists. Here, the guide information may be a two dimensional design and a three dimensional design by using an augmented reality technology.

Accordingly, if a user merely moves the cleaner according to the guide information displayed on the electronic apparatus, the user may complete the cleaning operation for entire cleaning areas, and perform the cleaning operation pleasantly.

Meanwhile, the case in which the electronic apparatus 200 is attached to the cleaner 100 has been described mainly, but it is not limited thereto.

For example, if a user photographs a cleaning object by holding the electronic apparatus 200 with one hand while performing the cleaning operation holding the cleaner 100 with the other hand, the electronic apparatus 200 may provide guide information in the same manner described above. Accordingly, the user may perform a cleaning operation effectively according to the guide information even if the electronic apparatus 200 is not attached to the cleaner 100.

Meanwhile, the methods according to the above described various embodiments may be implemented in a form of software or applications which may be installed in the existing electronic apparatus.

Further, the methods according to the above-described various embodiments may be realized by upgrading the software or hardware for an existing electronic apparatus.

The above-described embodiments may be executed through an embedded server in the electronic apparatus or through an external server outside the electronic apparatus.

A non-transitory computer readable medium in which a program sequentially performing the controlling method of an electronic apparatus according to the embodiments is stored may be provided.

The non-transitory computer readable medium is not a medium that stores data for a short moment such as a register, a cash and a memory and the like, but a medium that stores data semipermanently and which is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. An electronic apparatus comprising:
a display;
a camera configured to photograph a peripheral area of a cleaner;
and a processor configured to:
control to display an image of the peripheral area of the cleaner photographed by the camera,
in response to a user input for selecting a first area of the image being received, identify a pattern of the first area,
identify a plurality of second areas of the image which has a pattern of the first area, wherein the plurality of second areas are different from the first area selected by the user input
display a mark on the first area and the plurality of second areas respectively,
identify an area where the cleaner has passed among the first area and the plurality of second areas of the image based on a location information of the electronic apparatus attached to the cleaner, and
remove the mark displayed on the area where the cleaner has passed.

2. The electronic apparatus as claimed in claim 1, wherein the processor is further configured to:
identify a location of the mark based on a location of the electronic apparatus attached to the cleaner,
identify a direction to move the cleaner to the area in which the mark is displayed based on the location of the mark and a location of the cleaner, and
control the display to display guide information comprising information on the identified direction.

3. The electronic apparatus as claimed in claim 1, further comprising:
a communicator configured to perform communication with the cleaner, wherein the processor receives location information of the cleaner from the cleaner through the communicator.

4. The electronic apparatus as claimed in claim 3, wherein the processor photographs a peripheral area of the cleaner which moves according to a movement of the cleaner, through the camera, determines an area which has the same pattern as a cleaning object in the peripheral area of the moving cleaner, and displays the mark.

5. The electronic apparatus as claimed in claim 3, wherein the processor, in response to determining that the cleaner passes the area in which a mark is displayed, in the image, based on the location information of the cleaner received from the cleaner, removes a mark displayed on an area where the cleaner passes or displays a mark different from the displayed mark.

6. The electronic apparatus as claimed in claim 3, wherein the processor, in response to an area which has the same pattern as a cleaning object in the image corresponding to an area where the cleaner has passed previously, does not display the mark.

7. The electronic apparatus as claimed in claim 3, wherein the processor determines a moving route of the cleaner based on the location information of the cleaner, generates a cleaning map based on the determined moving route, and displays guide information regarding a moving direction of the cleaner on the display based on the generated cleaning map.

8. The electronic apparatus as claimed in claim 1, wherein the processor displays the mark and guide information on the image through an augmented reality.

9. A method for controlling an electronic apparatus comprising:
photographing a peripheral area of a cleaner through a camera;
displaying an image of the peripheral area of the cleaner photographed by the camera;
in response to a user input for selecting a first area of the image being received, identifying a pattern of the first area;
identifying a plurality of second areas of the image which has a pattern of the first area, wherein the plurality of second areas are different from the first area selected by the user input:
displaying a mark on the first area and the plurality of second areas respectively;
identifying an area where the cleaner has passed among the first area and the plurality of second areas of the image based on a location information of the electronic apparatus attached to the cleaner; and
removing the mark displayed on the area where the cleaner has passed.

10. The method as claimed in claim 9, further comprising:
identifying a location of the mark based on a location of the electronic apparatus attached to the cleaner;

identifying a direction to move the cleaner to the area in which the mark is displayed based on the location of the mark and a location of the cleaner; and displaying guide information comprising information on the identified direction.

11. The method as claimed in claim 9, further comprising:

receiving location information of the cleaner from the cleaner.

12. The method as claimed in claim 11, further comprising:

photographing a peripheral area of the cleaner which moves according to a movement of the cleaner; and determining an area which has the same pattern as a cleaning object in the peripheral area of the moving cleaner, and displaying the mark.

13. The method as claimed in claim 11, further comprising:

in response to determining that the cleaner passes the area in which a mark is displayed, in the image, based on the location information of the cleaner received from the cleaner, removing a mark displayed on an area where the cleaner passes or displaying a mark different from the displayed mark.

14. The method as claimed in claim 11, further comprising:

not displaying the mark in response to an area which has the same pattern as a cleaning object in the image corresponding to an area where the cleaner has passed previously.

15. The method as claimed in claim 11, further comprising:

determining a moving route of the cleaner based on the location information of the cleaner, and generating a cleaning map based on the determined moving route; and displaying guide information regarding a moving direction of the cleaner based on the generated cleaning map.

16. The method as claimed in claim 9, wherein the displaying the mark and guide information comprises displaying on the image through an augmented reality.

17. The electronic apparatus as claimed in claim 1, wherein the location information comprises a height information of the electronic apparatus and an angle information of the electronic apparatus.

* * * * *

UNITED STATES PATENT AND TRADEMARK OFFICE
CERTIFICATE OF CORRECTION

PATENT NO. : 10,949,668 B2  
APPLICATION NO. : 15/871886  
DATED : March 16, 2021  
INVENTOR(S) : Chang-ho Ha et al.

Page 1 of 1

It is certified that error appears in the above-identified patent and that said Letters Patent is hereby corrected as shown below:

On the Title Page  
Filed, Item (22):  
"Mar. 30, 2018"  
Should read:  
-- Jan. 15, 2018 --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*